United States Patent
Ellappan et al.

(10) Patent No.: US 10,680,896 B2
(45) Date of Patent: Jun. 9, 2020

(54) VIRTUALIZED NETWORK FUNCTION MONITORING

(71) Applicant: HEWLETT PACKARD ENTERPRISE DEVELOPMENT LP, Houston, TX (US)

(72) Inventors: Kumaresan Ellappan, Bangalore (IN); Ulhas Dhramarao Gourgonda, Bangalore (IN); Gajendra Subramanyam, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 19 days.

(21) Appl. No.: 15/737,327

(22) PCT Filed: Nov. 10, 2015

(86) PCT No.: PCT/US2015/059849
§ 371 (c)(1),
(2) Date: Dec. 18, 2017

(87) PCT Pub. No.: WO2016/204804
PCT Pub. Date: Dec. 22, 2016

(65) Prior Publication Data
US 2018/0176088 A1    Jun. 21, 2018

(30) Foreign Application Priority Data
Jun. 16, 2015   (IN) .......................... 3016/CHE/2015

(51) Int. Cl.
*G06Q 10/06*      (2012.01)
*G06F 9/50*       (2006.01)
(Continued)

(52) U.S. Cl.
CPC ...... *H04L 41/0893* (2013.01); *G06F 9/45558* (2013.01); *H04L 41/0816* (2013.01);
(Continued)

(58) Field of Classification Search
None
See application file for complete search history.

(56) References Cited

U.S. PATENT DOCUMENTS 9,407,514 B2 * 8/2016 Shiva ..................... G06F 9/5083
9,923,952 B2 * 3/2018 Maes ....................... H04L 67/10
(Continued)

FOREIGN PATENT DOCUMENTS

CN    103178990 A    6/2013
KR    20150000420 A    1/2015
(Continued)

OTHER PUBLICATIONS

European Telecommunications Standards Institute; "Network Functions Virtualisation (NFV); Management and Orchestration", Dec. 2014: 35 pages.
(Continued)

*Primary Examiner* — Nasser M Goodarzi
*Assistant Examiner* — Terrika Peterson

(57) ABSTRACT

A computing system comprising a monitoring engine to generate and save a plurality of monitoring rules based on virtualized network function (VNF) types and VNF components. Each monitoring rule corresponds to a unique combination of a VNF type and a VNF component. The monitoring engine further receives a VNF monitoring notification for monitoring a new VNF provisioned in a network function virtualization environment. The VNF monitoring notification indicates a key performance indicator (KPI) to be monitored for the new VNF and KPI parameters corresponding to the KPI. Further, the monitoring engine determines a monitoring rule corresponding to the new VNF, from among the plurality of monitoring rules, based on the KPI. The monitoring engine subsequently executes the monitoring
(Continued)

rule corresponding to the new VNF for monitoring KPIs for determining performance of the new VNF.

15 Claims, 5 Drawing Sheets

(51) Int. Cl.
*H04L 12/24* (2006.01)
*G06F 9/455* (2018.01)
*H04L 12/26* (2006.01)
*G06N 5/02* (2006.01)

(52) U.S. Cl.
CPC .......... *H04L 41/5009* (2013.01); *H04L 43/04* (2013.01); *G06F 2009/45591* (2013.01); *G06F 2009/45595* (2013.01)

(56) References Cited

U.S. PATENT DOCUMENTS

| | | | | |
|---|---|---|---|---|
| 2008/0196002 | A1* | 8/2008 | Koster | G06N 5/022 717/106 |
| 2008/0312986 | A1* | 12/2008 | Braun | G06Q 10/06 705/7.22 |
| 2009/0037210 | A1* | 2/2009 | Shimoni | G06Q 10/101 705/300 |
| 2013/0086250 | A1 | 4/2013 | Eskicioglu et al. | |
| 2014/0201374 | A1 | 7/2014 | Ashwood-Smith et al. | |
| 2014/0317261 | A1 | 10/2014 | Shatzkamer et al. | |
| 2014/0317293 | A1 | 10/2014 | Shatzkamer | |
| 2015/0082308 | A1* | 3/2015 | Kiess | G06F 9/5072 718/1 |
| 2016/0154692 | A1* | 6/2016 | Heinz | G06F 11/0772 714/2 |
| 2016/0205697 | A1* | 7/2016 | Tan | H04W 24/02 370/329 |
| 2017/0180189 | A1* | 6/2017 | Hosdurg | G06F 11/0709 |

FOREIGN PATENT DOCUMENTS

| | | |
|---|---|---|
| WO | WO-2014008915 A1 | 1/2014 |
| WO | WO-2015082013 A1 | 6/2015 |
| WO | WO-2008095787 A1 | 8/2018 |

OTHER PUBLICATIONS

International Search Report and Written Opinion, International Application No. PCT/US2015/059849, dated Mar. 17, 2016, pp. 1-10, KIPO.

JDS Uniphase Corporation, "JDSU Test, Assurance and Analytics Portfolio for Next Generation Virtual Networks," White Paper, Mar. 16, 2015, pp. 1-6.

Margaret Chiosi et al., "Network Functions Virtualisation (NFV)," White Paper #3, Oct. 2014, pp. 1-20, Issue 1.

Oracle, "Oracle Communications Application Orchestrator," Oracle Data Sheet, Jun. 24, 2014, pp. 1-5.

* cited by examiner

VIRTUALIZED NETWORK FUNCTION MONITORING

BACKGROUND

Cloud computing networks have reshaped the field of Internet-provided services due to its beneficial nature for individual users as well as large enterprises. The cloud computing networks utilize virtual machines (VMs) that allow virtualization of an actual physical computing system. Network Function Virtualization (NFV) is a network architecture that aims at using cloud computing for providing telecommunication services. A NFV environment includes a plurality of virtualized network functions (VNFs) for performing functions of various network entities, such as load balancers, home location registers, and base stations. The VNFs are implemented as virtualized machines such that they can run on a range of industry standard server hardware for implementing the network functions.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

Figure 1:
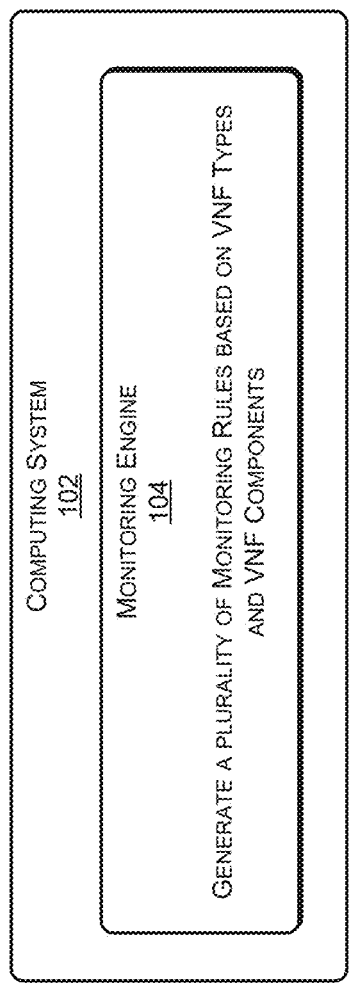
FIG. 1 illustrates a block diagram of a computing system for provisioning and monitoring virtualized network functions in a network function virtualization environment, according to an example of the present subject matter.

Network Function Virtualization (NFV) environment is a cloud computing based network architecture implemented for virtualizing telecommunication network based services. Any NFV environment includes a plurality of virtualized network functions (VNFs) for performing various network functions, such as message routing, traffic analysis, and security measure implementation.

To efficiently implement and maintain the VNFs, a network provider may regularly monitor the performance of the VNFs implemented in the NFV environment. One of the approaches for monitoring the performance of the VNFs includes assigning a monitoring rule for each VNF at the time of provisioning the VNF. The monitoring rules include a list of VNF components associated with the VNF along with a list of corresponding performance parameters that have to be monitored for each VNF component. Such monitoring rules may be assigned by a monitoring engine based on the type of VNF such that for all VNFs of a similar type, the same monitoring rule is assigned.

Using the same monitoring rule for all VNFs of a similar type may, however, lead to wastage of resources utilized for monitoring the VNFs as irrespective of similarity in type, all VNFs may not be utilizing the VNF components in a similar manner. For instance, a VNF of a particular type may be assigned to an application that extensively utilizes its processing unit, while another VNF of the same type may be assigned to an application that extensively utilizes its disk storage. Assigning a monitoring rule that monitors both the processing unit and the disk storage of all VNFs of the particular type may result in unwanted load over the monitoring engine.

Further, such an approach may not support customization of VNFs, i.e., VNFs having additional or less VNF components in comparison to VNF components associated with regular VNFs of the same VNF type. In case additional VNF components are present, the monitoring engine may not be able to monitor such component as these VNF components might not have been included in the monitoring rules. In case of reduced VNF components, the monitoring engine may generate error reports on not being able to locate the VNF components as per the monitoring rules. Thus, a system administrator may have to be assigned for manually customizing existing rules in the above described situations.

Approaches for provisioning and monitoring virtualized network functions in a network function virtualization environment are described. The present approaches facilitate in dynamically assigning monitoring rules for a VNF. As per an example of the present subject matter, a pre-defined set of monitoring rules is maintained and used by a monitoring engine for monitoring performance of the VNFs. The monitoring rules are generated based on a VNF type and a VNF component such that each monitoring rule corresponds to a unique combination of a VNF type and a VNF component. While assigning the monitoring rules to a VNF, the monitoring engine may determine the VNF type and the VNF component that has to be monitored for the VNF and accordingly obtain a monitoring rule from the pre-defined set. Thus, for each VNF, the monitoring engine may monitor those VNF components for which monitoring rules are executed.

In accordance to an example of the present subject matter, a plurality of monitoring rules is generated based on the VNF types and VNF components. The monitoring rules are generated such that each monitoring rule corresponds to a unique combination of a VNF type and a VNF component. For instance, if a VNF of particular VNF type may have two VNF components, say, a first component and a second component, then one monitoring rule may correspond to a combination of the particular VNF type and the first component. A second monitoring rule may correspond to a combination of the particular VNF type and the second component. The monitoring rules are subsequently saved in a monitoring rules database for being referred at later time while assigning the monitoring rules to a VNF being provisioned.

In operation, upon provisioning of resources for a new VNF, a VNF monitoring notification may be transmitted to the monitoring engine requesting the monitoring engine to monitor the new VNF. In one example, the monitoring notification may indicate a key performance indicator (KPI) to be monitored for the new VNF and KPI parameters corresponding to the KPI. The KPI may correspond to a VNF component that has to be monitored, from among the VNF components used by the new VNF. Upon receiving the VNF monitoring notification, the monitoring engine may determine a monitoring rule corresponding to the new VNF from among the plurality of monitoring rules, based on the KPI. The monitoring engine may then execute the monitoring rule corresponding to the new VNF for monitoring the performance of the new VNF.

In one example, the monitoring engine may determine a KPI value of the KPI being monitored at regular intervals as defined in the monitoring rule. The KPI value may then be compared with a KPI threshold value indicated in the monitoring rule to determine the performance of the VNF. In case the KPI value goes beyond the KPI threshold value, an error correction request may be generated for initiating further analysis and error correction.

The present subject matter thus facilitates in dynamically assigning monitoring rules for VNFs based on the VNF components that are have to be monitored for monitoring performance of the VNF. As previously described, monitoring rules are defined based on the VNF type and the VNF component that has to be monitored and saved in a database for being referred to at later stages. Additionally, having a predefined set of monitoring rules helps in reducing time and resources utilized for assigning monitoring rules to VNFs. Further, since each monitoring rule corresponds to a unique combination of a VNF type and a monitoring rule, therefore a monitoring rule can be assigned based on the VNF component that has to be monitored. Assigning monitoring rules based on VNF components helps in reducing the resources utilized in monitoring VNFs as the VNF components that are useful in indicating performance of the VNF may be monitored while other VNF components may not be monitored. Further, a combination of more than one monitoring rules may also be assigned to a VNF in case more than one VNF components have to be monitored for the VNF, thus providing flexibility to the monitoring engine for dynamically assigning monitoring rules.

The present subject matter is further described with reference to FIGS. 1 to 5. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a computing system 102, according to an example of the present subject matter. The computing system 102 may be implemented for provisioning and monitoring virtualized network functions (VNFs) in a network function virtualization (NFV) environment. The computing system 102 may be a virtual machine hosted in the NFV environment.

The computing system 102 may include a monitoring engine 104 for monitoring performance of the VNFs implemented in the NFV environment. In one example, the monitoring engine 104 generates a plurality of monitoring rules based on VNF types of various VNFs that may be hosted within the NFV environment and VNF components that may be used by the VNFs. The monitoring engine 104 may generate the monitoring rules such that each monitoring rule corresponds to a unique combination of a VNF type and a VNF component. Further, the monitoring engine 104 may save the monitoring rules for being used for monitoring the VNFs.

For instance, upon receiving a VNF monitoring notification for monitoring a new VNF provisioned in NFV environment, the monitoring engine 104 may access the monitoring rules to determine a monitoring rule that may be assigned to the new VNF. In one example, the VNF monitoring notification indicates a key performance indicator (KPI) to be monitored for the new VNF and KPI parameters corresponding to the KPI. The monitoring engine 104 may obtain the KPI from the VNF monitoring notification and determine a monitoring rule corresponding to the new VNF, from among the plurality of monitoring rules, based on the KPI. For instance, if the KPI relates to performance of a particular VNF component allocated to the new VNF, the monitoring engine 104 obtain a monitoring rule that corresponds to a combination of the particular VNF component and the VNF type of the new VNF.

The monitoring engine 104 may subsequently execute the monitoring rule corresponding to the new VNF for monitoring KPIs for determining performance of the new VNF.

Figure 2:
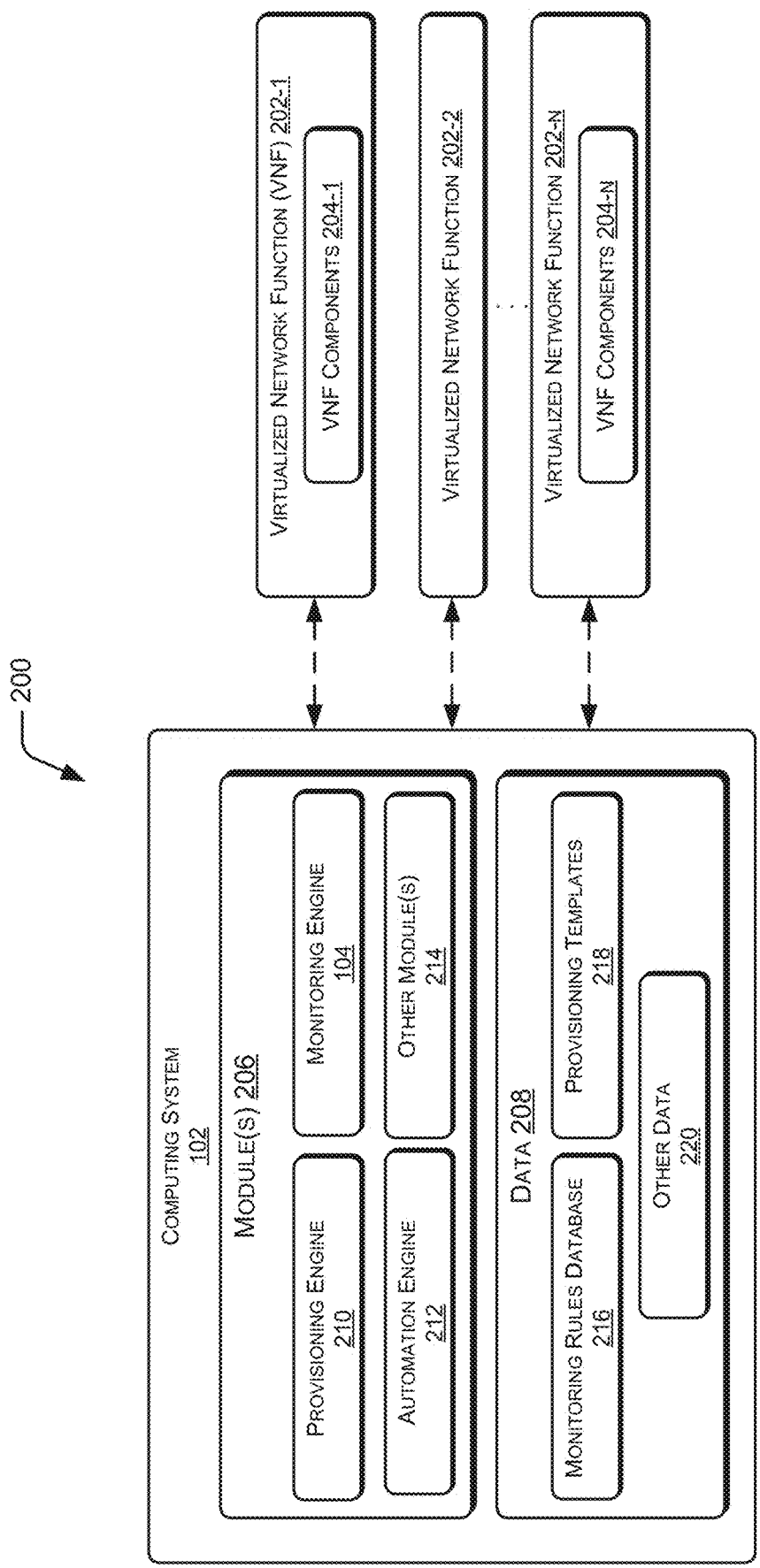
FIG. 2 illustrates various example components of a computing system for provisioning and monitoring virtualized network functions, according to an example of the present subject matter.

FIG. 2 illustrates various example components of the computing system 102, according to an example of the present subject matter. In one example the computing system 102 is hosted in a network function virtualization (NFV) environment 200. The NFV environment 200 further includes a plurality of virtualized network functions (VNFs) 202-1, 202-2, . . . , 202-*n*, hereinafter collectively referred to as VNFs 202 and individually referred to as VNF 202, communicating with the computing system 102.

In one example, the NFV environment 200 is a cloud based network architecture implemented for virtualizing telecommunication network based services. A service provider hosting the NFV environment 200 may install one or more of a variety of computing devices (not shown in the figure), such as a desktop computer, cloud servers, mainframe computers, workstation, a multiprocessor system, a network computer, and a server for hosting the VNFs 202 in the form of virtual machines. In one example, the VNFs 202 may be hosted in the NFV environment 200 for performing various network functions, such as domain name lookup service, content delivery service, customer premises equipment function, interactive voice response service, home location service for a mobile network, message routing, traffic analysis, and security measure implementation. The VNFs 202 may be hosted as network elements, such as switching elements, mobile network nodes, and firewalls in the NFV environment 200. Each of the VNFs 202 may thus be hosted as a self-contained platform having its own VNF components 204, such as processors, storage disks, and network interfaces for running its own operating system and applications. For instance, the VNF 202-1 and 202-*n* may include the VNF components 204-1 and 204-*n*, respectively.

As previously described, the computing system 102 may be hosted in the NFV environment 200 for provisioning resources for the VNFs 202 and monitoring performance of the VNFs 202. In one example, the computing system 102 includes module(s) 206, and data 208.

The module(s) 206, amongst other things, include routines, programs, objects, components, and data structures, which perform particular tasks or implement particular abstract data types. The module(s) 206 may also be implemented as, signal processor(s), state machine(s), logic circuitries, and/or any other device or component that manipulate signals based on operational instructions. Further, the module(s) 206 can be implemented by hardware, by computer-readable instructions executed by a processing unit, or by a combination thereof.

The module(s) 206 may include a provisioning engine 210, the monitoring engine 104, an automation engine 212 and other module(s) 214. The other modules 214 may include programs or coded instructions that supplement applications and functions, for example, programs in an operating system of the computing system 102. Further, the data 208 may include monitoring rules database 216, provisioning templates 218, and other data 220.

As previously described, the present subject matter facilitates in dynamically assigning predefined monitoring rules to the VNFs 202 based on the VNF components 204 being used by the VNFs 202. In one example, the monitoring engine 104 may generate a plurality of monitoring rules for being used later while assigning the monitoring rules to a VNF 202 being provisioned in the NFV environment 200. The monitoring engine 104 may generate the monitoring rules based on VNF types of the VNFs 202 hosted within the NFV environment 200 and the VNF components 204 used by the VNFs 202. The monitoring engine 104 may initially determine various VNF types, i.e., different types of VNFs 202 that may be hosted within the NFV environment 200 and VNF components 204 that may be used by the VNFs 202. In one example, the monitoring engine 104 may determine the VNF types and the VNF components 204 based on inputs received from either a user or the service provider hosting the NFV environment 200. In another example, the monitoring engine 104 may analyze the VNFs 202 already installed within the NFV environment 200 to determine the VNF types and the VNF components 204. On generating the monitoring rules based on the VNF types and the VNF components 204, the monitoring engine 104 may save the monitoring rules in the monitoring rules database 216 for being referenced for monitoring the VNFs 202.

In operation, when a user, say, a network service provider wishes to install a new VNF for providing certain network function, the user may send a provisioning request to the computing system 102. The provisioning request may include information about the network function which the user wants the new VNF to perform. Upon receiving the provisioning request, the provisioning engine 210 may analyze the provisioning request to ascertain the network functionality for which a new VNF 202 has to be hosted in the NFV environment 200. Based on the network functionality, the provisioning engine 210 may determine the VNF type of the new VNF 202 and the VNF components 204 to be allocated to the new VNF 202.

The provisioning engine 210 may subsequently obtain a provisioning template for provisioning the new VNF based on the provisioning request. In one example, the provisioning engine 210 may obtain the provisioning template from the predefined provisioning templates 218. In another example, the provisioning engine 210 may generate the provisioning template for the new VNF 202 based on preset rules and template parameters.

Upon obtaining the provisioning template, the provisioning engine 210 may update the provisioning template to include key performance indicator (KPI) to be monitored for the new VNF and KPI parameters corresponding to the KPI. KPI are parameters that may be used to indicate performance of different VNF components of a VNF. Examples of KPI include, but are not limited to, central processing unit (CPU) usage, memory usage, number of packets received, and number of packets transmitted. Thus, each VNF component 204 may have at least one corresponding KPI that may be monitored for tracking performance of the VNF component 204.

The KPI parameters define parameters for determining value of a KPI for a VNF 202. Example of KPI parameters include, but are not limited to, a KPI target, threshold limits, and monitoring frequency. The KPI target indicates information, such as hostname and IP address about the VNF 202 with which the KPI is associated. The threshold limits indicate performance ranges within which KPI values are acceptable such that an error may be indicated if the KPI value goes beyond the threshold limits. Monitoring frequency indicates how often a KPI has to be checked for obtaining KPI values.

In one example, the provisioning engine 210 may identify the KPIs and the KPI parameters that have to be monitored for the new VNF based on the VNF components, the VNF type, and other information obtained from the provisioning request. The provisioning engine 210 may subsequently update the provisioning template to include the KPI and the KPI parameters and provision the new VNF 202. Provisioning the new VNF 202 may include, amongst other procedures, assigning the network functions to the VNF, based on the provisioning request, and provisioning resources to the new VNF 202 for performing the assigned network function. The provisioning engine 210 may further generate and transmit a VNF monitoring notification to the monitoring engine 104 requesting the monitoring engine 104 to monitor the new VNF 202. The monitoring notification may indicate the KPI to be monitored for the new VNF 202 and the KPI parameters corresponding to the KPI.

The monitoring engine 104 may analyze the VNF monitoring notification to determine the KPI that has to be monitored and the KPI parameters corresponding to the KPI. The monitoring engine 104 may subsequently determine a monitoring rule corresponding to the new VNF 202 from among the plurality of monitoring rules saved in the monitoring rules database 216 based on the KPI. For instance, if the new VNF 202 is a home location register (HLR) and the KPI is indicated as CPU usage, the monitoring engine 104 may obtain a monitoring rule having VNF type as HLR and VNF component 204 as a processor. Further, in case the VNF monitoring notification indicates more than one KPI, the monitoring engine 104 may obtain more than one monitoring rule, equal to the number of KPIs, with each monitoring rule corresponding to the same VNF type but a different KPI. The monitoring rules may be identified such that for all KPIs mentioned in the VNF monitoring notification, a corresponding monitoring rule is identified. Thus, having monitoring rules predefined based on VNF components and VNF types facilitates the monitoring engine 104 in assigning various combinations of the monitoring rules based on VNF components 204 that have to be monitored for the VNF.

Further, the monitoring engine 104 may update the monitoring rule corresponding to the new VNF 202 based on the KPI parameters indicated in the VNF monitoring notification. In one example, the monitoring engine 104 may update the monitoring rule to specify various parameters, such as the details of the VNF component 204 to be monitored, monitoring frequencies, and threshold limits of KPI threshold values based on the KPI parameters indicated in the VNF monitoring notification. The KPI threshold values are various thresholds limit that, if crossed, indicate a fault in the VNF component 204 being monitored. Examples of the KPI threshold values include, but are not limited to, a maximum KPI threshold value, a minimum KPI threshold value, a critical KPI threshold value, a major KPI threshold value, a minor KPI threshold value, and a warning KPI threshold value.

The monitoring engine 104 may subsequently execute the monitoring rule for monitoring the performance of the new VNF 202. The monitoring engine 104 may further determine the KPI value of the KPI at regular intervals as defined in the monitoring rule based on the monitoring frequencies. The monitoring engine 104 may compare the KPI value with the KPI threshold value indicated in the monitoring rule. If the monitoring engine 104 determines the KPI value to be beyond the KPI threshold value, an error correction request may be generated by the monitoring engine for initiating further analysis and error correction. In one example, the monitoring engine 104 may compare the KPI value with each of the KPI threshold values indicated in the monitoring rule to determine the performance of the VNF. In such a case, the monitoring engine 104 may generate the error correction request if the KPI value goes beyond any of the KPI threshold value. For instance, the error correction request may be generated if the KPI value is determined to be less than the minimum KPI threshold value or greater than the maximum KPI threshold value. Further, the monitoring engine 104 may transmit the error correction request to the automation engine 212 for determining the cause of error in the VNF component 204 corresponding to the KPI being monitored.

Upon receiving the error correction request, the automation engine 212 may analyze the error to determine the cause of the error based on error identification parameters, such as the KPI value, the VNF type, and the VNF component 204 being monitored. The automation engine 212 may subsequently transmit a correction request to the provisioning engine 210 requesting the provisioning engine 210 to take a corrective action. The correction request may indicate the cause of error for the KPI value going beyond the KPI threshold value.

The provisioning engine 210 may accordingly take the corrective action for the new VNF 202 upon receiving the correction request. Examples of the corrective action include, but are not limited to, adjusting capacity of the VNF component 204 or the new VNF 202, rebooting the VNF component 204, stopping the operation of the VNF component 204, balancing the load of the VNF component 204, migrating the new VNF 202 from the current server hosting the new VNF 202 to another server in order to avoid repetition of the error, and reconfiguring system settings for the VNF component 204. For instance, the provisioning engine 212 may take corrective actions to adjust the capacity of the VNF 202 by adding new resources to the new VNF 202 if the KPI value is greater than the maximum KPI threshold value. The provisioning engine 212 may also adjust the capacity of the new VNF 202 by removing a resource corresponding to the VNF component 204 of the new VNF 202 if the KPI value is less than the minimum KPI threshold value.

Figure 3:
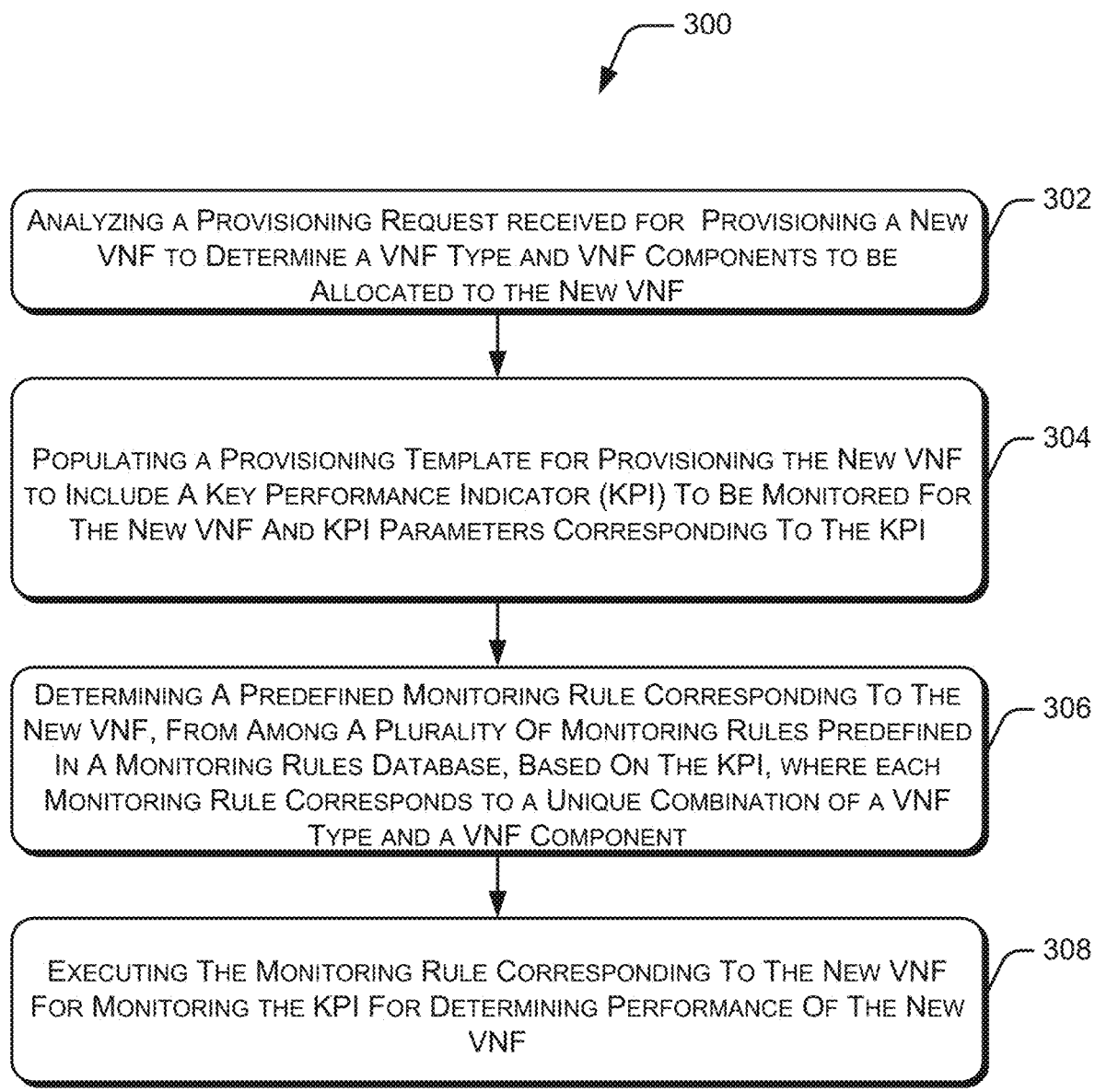
FIG. 3 illustrates an example method for provisioning and monitoring virtualized network functions, according to an example of the present subject matter.
Figure 4:
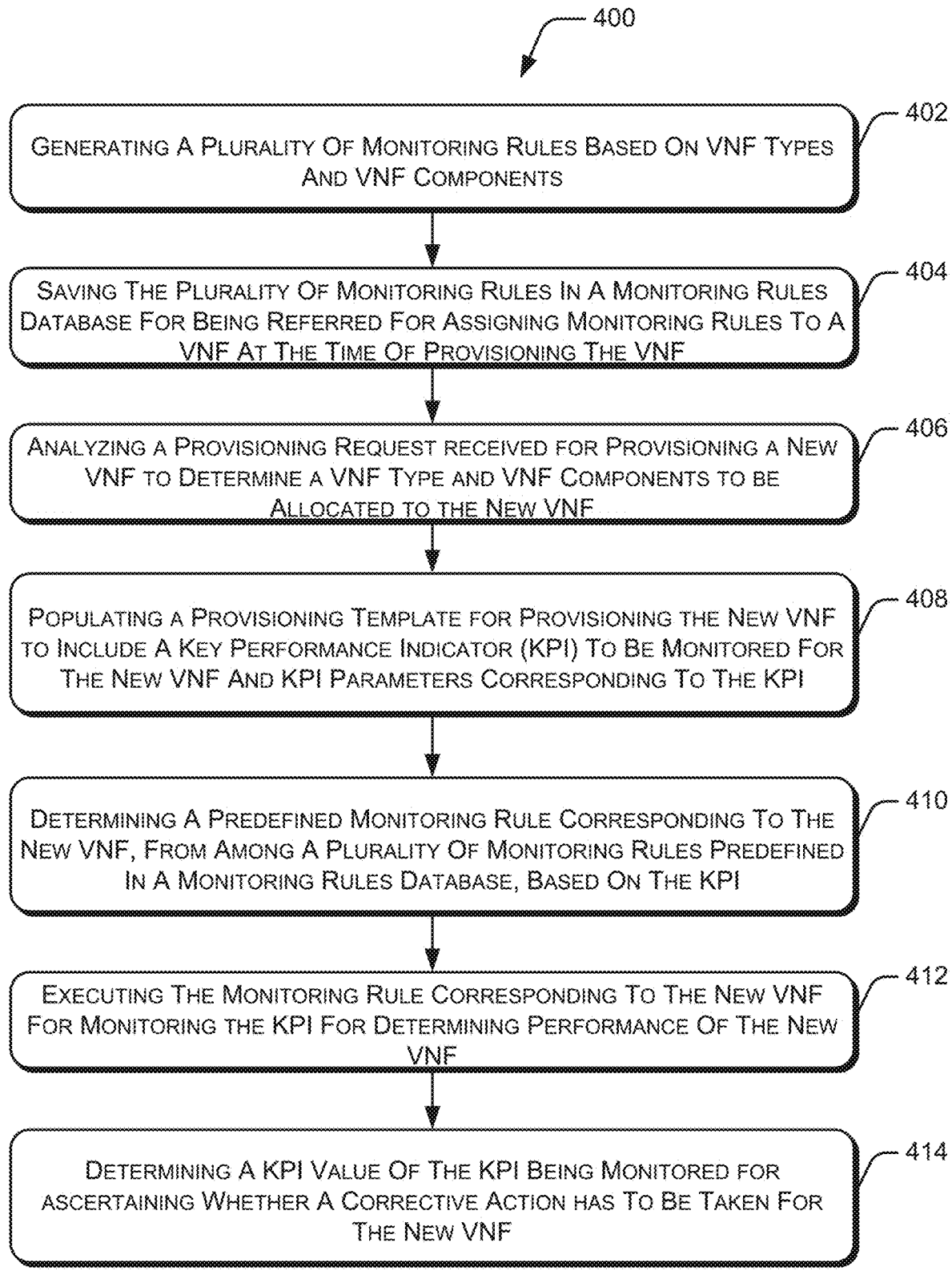
FIG. 4 illustrates an example method for provisioning and monitoring virtualized network functions, according to another example of the present subject matter.

FIGS. 3 and 4 illustrate example methods 300 and 400, respectively, for provisioning and monitoring virtualized network functions, in accordance with an example of the present subject matter. The order in which the methods are described is not intended to be construed as a limitation, and any number of the described method blocks may be combined in any order to implement the aforementioned methods, or an alternative method. Furthermore, the methods 300 and 400 may be implemented by processing resource or computing device(s) through any suitable hardware, non-transitory machine readable instructions, or combination thereof.

It may also be understood that the methods 300 and 400 may be performed by virtualized computing systems, such as the computing system 102 hosted in a network function virtualization environment. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, the methods 300 and 400 are described below with reference to the computing system 102 as described above, other suitable systems for the execution of these methods can be utilized. Additionally, implementation of these methods is not limited to such examples.

Referring to FIG. 3, at block 302, a provisioning request received for provisioning a new VNF is analyzed. In one example, the provisioning request is analyzed to determine a VNF type of the new VNF and VNF components to be allocated to the new VNF. The provisioning request may be received and analyzed by a provisioning engine of a computing system, such as the computing system 102 hosted in a network function virtualization environment.

At block 304, a provisioning template is populated for provisioning the new VNF to include a key performance indicator (KPI) to be monitored for the new VNF and KPI parameters corresponding to the KPI. In one example, upon determining the VNF type and the VNF components to be used, a VNF component whose performance has to be monitored is identified, from among the VNF components allocated to the new VNF. Subsequently, the KPI corresponding to the VNF component may be included in the provisioning template along with the KPI parameters.

At block 306, a predefined monitoring rule corresponding to the new VNF is determined from among a plurality of monitoring rules predefined in a monitoring rules database. In one example, the monitoring rule is determined by a monitoring engine of the computing system 102 based on the KPI. Each of the plurality of monitoring rules corresponds to a unique combination of a VNF type and a VNF component. The monitoring rule determined for the VNF may thus correspond to a combination of the VNF type of the new VNF and the VNF component for which the KPI was included in the provisioning template.

At block 308, the monitoring rule corresponding to the new VNF is executed for monitoring KPIs for determining performance of the new VNF.

Referring to FIG. 4, at block 402, a plurality of monitoring rules is generated. In one example, the monitoring rules are generated based on VNF types and VNF components. For instance, a monitoring engine, such as the monitoring engine 104 of the computing system 102 may generate the monitoring rules such that each monitoring rule corresponds to a unique combination of a VNF type and a VNF component.

At block 404, the plurality of monitoring rules is saved in a monitoring rules database. In an example, the monitoring engine may save the monitoring rules in the monitoring rules database so that the monitoring rules can be referred for assigning monitoring rules to a VNF at the time of provisioning the VNF.

At block 406, a provisioning request received for provisioning a new VNF is analyzed. In one example, the provisioning request is received by a provisioning engine, such as the provisioning engine 210 of the computing system 102 hosted in a network function virtualization environment. The provisioning request is analyzed to determine a VNF type of the new VNF and VNF components to be allocated to the new VNF.

At block 408, a provisioning template is populated for provisioning the new VNF. In one example, the provisioning template is populated to include a key performance indicator (KPI) to be monitored for the new VNF and KPI parameters corresponding to the KPI. The provisioning template may be initially obtained by a provisioning engine based on the provisioning request. Further, a VNF component whose performance has to be monitored is identified, from among the VNF components allocated to the new VNF and the KPI corresponding to the VNF component may be included in the provisioning template along with the KPI parameters.

At block 410, a predefined monitoring rule corresponding to the new VNF is determined. In one example, the monitoring rule is obtained from among a plurality of monitoring rules predefined in the monitoring rules database. The monitoring rule is determined by a monitoring engine of the computing system 102 based on the KPI. Each of the plurality of monitoring rules corresponds to a unique combination of a VNF type and a VNF component. The monitoring rule determined for the VNF may thus correspond to a combination of the VNF type of the new VNF and the VNF component for which the KPI was included in the provisioning template.

At block 412, the monitoring rule corresponding to the new VNF is executed for monitoring the KPI for determining performance of the new VNF.

At block 414, the performance of the VNF component is monitored to determine a KPI value of the KPI being monitored. In one example, the monitoring engine may determine the KPI value of the KPI being monitored at regular intervals as defined in the monitoring rule. The KPI value may then be compared with a KPI threshold value indicated in the monitoring rule to determine the performance of the VNF. The performance is monitored to ascertain whether a corrective action needs to be taken for the new VNF.

Figure 5:
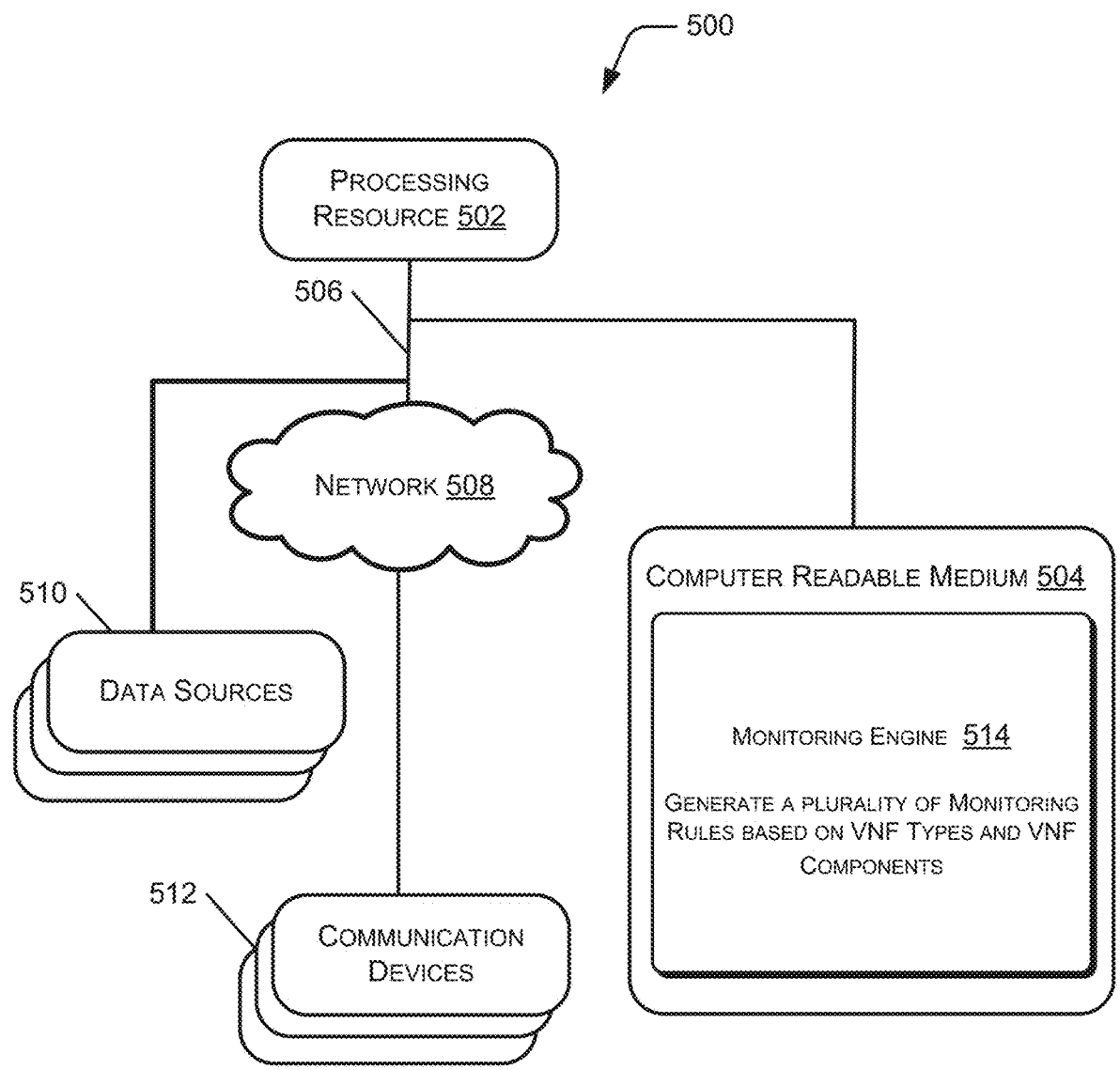
FIG. 5 illustrates an example network environment implementing a non-transitory computer readable medium for provisioning and monitoring virtualized network functions, according to an example of the present subject matter.

FIG. 5 illustrates an example network environment implementing a non-transitory computer readable medium for file system replication, according to an example of the present disclosure. The system environment 500 may comprise at least a portion of a public networking environment or a private networking environment, or a combination thereof. In one implementation, the system environment 500 includes a processing resource 502 communicatively coupled to a computer readable medium 504 through a communication link 506.

For example, the processing resource 502 can include one or more processors of a computing device for file system replication. The computer readable medium 504 can be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the computer readable medium 504 through a network 508. The network 508 may be a single network or a combination of multiple networks and may use a variety of different communication protocols.

The processing resource 502 and the computer readable medium 504 may also be coupled to requested data sources 510 through the communication link 506, and/or to communication devices 512 over the network 508. The coupling with the requested data sources 510 enables in receiving the requested data in an offline environment, and the coupling with the communication devices 512 enables in receiving the requested data in an online environment.

In one implementation, the computer readable medium 504 includes a set of computer readable instructions, implementing a monitoring engine 514. The set of computer readable instructions can be accessed by the processing resource 502 through the communication link 506 and subsequently executed to process requested data communicated with the requested data sources 510 in order to facilitate provisioning and monitoring virtualized network functions (VNFs). When executed by the processing resource 502, the instructions of the monitoring engine 514 may perform the functionalities described above in relation to the monitoring engine 104.

For example, the monitoring engine 514 may receive a VNF monitoring notification for monitoring a new VNF provisioned recently. In one example, the VNF monitoring notification indicates a key performance indicator (KPI) to be monitored for the new VNF and KPI parameters corresponding to the KPI. The KPI corresponds to a VNF component that has to be monitored, from among the VNF components allocated to the new VNF. On receiving the VNF monitoring notification, the monitoring engine 514 may determine a predefined monitoring rule corresponding to the new VNF based on the KPI. The monitoring engine 514 may obtain the monitoring rule, from among a plurality of monitoring rules predefined in a monitoring rules database. In one example, the monitoring rules are predefined such that each monitoring rule corresponds to a unique combination of a VNF type and a VNF component.

The monitoring engine 514 may further execute the monitoring rule corresponding to the new VNF for monitoring performance of the new VNF using the KPI parameters. In one example, the monitoring engine 514 may monitor the performance of the VNF component at regular intervals defined in the monitoring rule to determine a KPI value of the KPI being monitored. The monitoring engine 514 may subsequently compare the KPI value with a KPI threshold value indicated in the monitoring rule corresponding to the new VNF to determine whether a corrective action needs to be taken for the new VNF. For instance, if the KPI value goes beyond KPI threshold value, the monitoring engine 514 may determine a corrective action has to be taken and accordingly request other modules of the computer readable medium 504 to analyze the cause of the error and accordingly take the corrective action.

In one example, the monitoring engine 514 may compare the KPI value with each of a plurality of KPI threshold values indicated in the monitoring rule to determine the performance of the VNF.

Although examples for the present disclosure have been described in language specific to structural features and/or methods, it should stood that the appended claims are not necessarily limited to the specific features or methods described. Rather, the specific features and methods are disclosed and explained as examples of the present disclosure.

What is claimed:

1. A computing system comprising:
a processing unit: and
a storage device communicatively coupled to the processing unit and storing instructions, that when executed by the processing unit, cause the computing system to provide a monitoring engine functional module to:
generate and save a plurality of monitoring rules based on virtualized network function (VNF) types and VNF components, wherein each monitoring rule corresponds to a unique combination of VNF type and VNF component and each monitoring rule identifies at least one performance parameter to be monitored for a VNF component;
receive a VNF monitoring notification for monitoring a first VNF provisioned in a network function virtualization environment, wherein the VNF monitoring notification indicates a first key performance indicator (KPI) to be monitored for the first VNF;

determine a first monitoring rule corresponding to the first VNF, from among the plurality of monitoring rules, based on the first KPI, the first monitoring rule associated with a first VNF component of the first VNF and identifying KPI parameters corresponding to the first KPI relative to the first VNF component; and execute the first monitoring rule for the first VNF to monitor activity of the first VNF component for determining performance of the first VNF.

2. The computing system of claim 1, wherein the storage device further stores instructions, that when executed by the processing unit, cause the computing system to provide a provisioning engine functional module to:

receive a provisioning request for implementing the first VNF;

analyze the provisioning request to determine a VNF type of the first VNF and a set of VNF components to be allocated to the first VNF;

obtain a provisioning template for provisioning the first VNF based on the provisioning request;

update the provisioning template to include a second KPI to be monitored and associated KPI parameters to create an updated provisioning template, the second KPI and associated KPI parameters based on a second VNF component to be monitored, the second VNF component from among the set of VNF components to be allocated to the first VNF, wherein the associated KPI parameters include a target, a KPI threshold value, and a frequency; and provision resources for the first VNF using the updated provisioning template.

3. The computing system of claim 1, wherein the monitoring engine further is to:

determine a KPI value of the first KPI being monitored;

compare the KPI value with a KPI threshold value indicated in the first monitoring rule corresponding to the first VNF and the first KPI; and transmit, based on the comparison indicating a threshold crossing, an error correction request to an automation engine of the computing system for determining cause of error in the first VNF component corresponding to the first KPI being monitored.

4. The computing system of claim 3, wherein the provisioning engine further is to:

receive a correction request from the automation engine, the correction request indicating a corrective action; and perform the corrective action for the first VNF in response to receiving the correction request.

5. The computing system of claim 1, wherein the monitoring engine further is to update the first monitoring rule corresponding to the first VNF before executing the first monitoring rule for determining performance of the first VNF.

6. A computer-implemented method of monitoring a virtualized network function (VNF) instance based on applying a monitoring rule associated with a VNF component associated with the VNF instance, the method comprising:

analyzing, using a processor of a computer system, a provisioning request received at a provisioning engine function module executing on the computer system, the provisioning request for provisioning a first virtualized network function (VNF), the analyzing to determine a VNF type of the first VNF and a set of VNF components to be allocated to the first VNF;

populating a provisioning template for provisioning the first VNF to include a first key performance indicator (KPI) to be monitored for the first VNF and KPI parameters corresponding to the first KPI based on a first VNF component that has to be monitored, the first VNF component from among the set of VNF components to be allocated to the first VNF;

determining a first monitoring rule corresponding to the first VNF, from among a plurality of monitoring rules in a monitoring rules database, the determination based on the first KPI, wherein each of the plurality of monitoring rules corresponds to a unique combination of VNF type and VNF component; and executing the first monitoring rule for the first VNF to monitor activity of the first VNF component for determining performance of the first VNF.

7. The method of claim 6, further comprising:

generating the plurality of monitoring rules based on unique combinations of VNF types and VNF components; and saving the generated plurality of monitoring rules in the monitoring rules database prior to assigning selected monitoring rules to a new VNF at the time of provisioning the new VNF.

8. The method of claim 6, further comprising:

determining a KPI value of the first KPI being monitored;

comparing the KPI value with a KPI threshold value indicated in the first monitoring rule corresponding to the first VNF and the first KPI; and transmitting, based on the comparing providing an indication of threshold crossing, an error correction request to an automation engine for determining cause of error in the first VNF component corresponding to the first KPI being monitored.

9. The method of claim 8, further comprising:

receiving a correction request from the automation engine, the correction request indicating a corrective action; and performing the corrective action for the first VNF in response to receiving the correction request.

10. The method of claim 6, further comprising:

updating the first monitoring rule corresponding to the first VNF before executing the first monitoring rule for determining performance of the first VNF.

11. The method of claim 6, further comprising:

processing the provisioning request to implement the first VNF;

provisioning resources to the first VNF using the provisioning template; and transmitting a VNF monitoring notification to a monitoring engine for monitoring the first VNF, wherein the VNF monitoring notification indicates the first KPI to be monitored for the first VNF and the KPI parameters corresponding to the first KPI.

12. A non-transitory computer readable medium having a set of computer readable instructions that, when executed by a processor, cause the processor to:

receive a virtualized network function (VNF) monitoring notification for monitoring a new VNF provisioned within a network function virtualization (NVF) environment, wherein the VNF monitoring notification indicates a key performance indicator (KPI) to be monitored for the new VNF and KPI parameters corresponding to the KPI, and wherein the KPI corresponds to a first VNF component to be monitored for the new VNF;

determine a first monitoring rule corresponding to the new VNF, from among a plurality of monitoring rules predefined in a monitoring rules database. the determination based on the KPI, wherein each of the plurality of monitoring rules corresponds to a unique combination of VNF type and VNF component;

execute the first monitoring rule corresponding to the new VNF for monitoring performance of the new VNF using the KPI parameters relative to the first VNF component;

monitor the performance of the first VNF component to determine a KPI value of the KPI being monitored; and compare the KPI value with a KPI threshold value indicated in the first monitoring rule corresponding to the new VNF to determine whether a corrective action needs to be taken for the new VNF.

13. The non-transitory computer readable medium of claim 12, wherein the computer readable instructions, when executed, further cause the processor to:

generate the plurality of monitoring rules based on unique combinations of VNF types and VNF components; and save the generated plurality of monitoring rules in the monitoring rules database prior to assigning selected monitoring rules to a new instance of a VNF at the time of provisioning the new instance of the VNF.

14. The non-transitory computer readable medium of claim 12, wherein the computer readable instructions, when executed, further cause the processor to provide a provisioning engine function module to provision a new VNF prior to the VNF monitoring notification, the provisioning engine to:

receive a provisioning request for implementing the new VNF;

analyze the provisioning request to determine a VNF type of the new VNF and set of VNF components to be allocated to the new VNF;

obtain a provisioning template for provisioning the new VNF based on the provisioning request;

update the provisioning template to create an updated provisioning template, the updated provisioning template including the KPI to be monitored and the KPI parameters associated with a first VNF component from the set of VNF components to be monitored, wherein the KPI parameters include a target, a KPI threshold value, and a frequency; and provision resources to the new VNF using the updated provisioning template.

15. The non-transitory computer readable medium of claim 12, wherein the computer readable instructions, when executed, further cause the processor to:

update the first monitoring rule corresponding to the new VNF based on the KPI parameters indicated in the VNF monitoring notification before executing the first monitoring rule for monitoring performance of the first VNF component to determine performance of the new VNF.

* * * * *